United States Patent
Grossmann et al.

(10) Patent No.: US 9,537,439 B2
(45) Date of Patent: Jan. 3, 2017

(54) METHOD AND APPARATUS FOR ADAPTING COMMUTATION FOR AN ELECTRONICALLY COMMUTATED ELECTRICAL MACHINE

(75) Inventors: Alex Grossmann, Leonberg (DE); Udo Sieber, Bietigheim (DE); Ralf Buehrle, Hochberg (DE); Zeynep Tosun, Istanbul (TR)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 14/005,526

(22) PCT Filed: Jan. 16, 2012

(86) PCT No.: PCT/EP2012/050549
§ 371 (c)(1),
(2), (4) Date: Feb. 27, 2014

(87) PCT Pub. No.: WO2012/126641
PCT Pub. Date: Sep. 27, 2012

(65) Prior Publication Data
US 2014/0159617 A1 Jun. 12, 2014

(30) Foreign Application Priority Data
Mar. 18, 2011 (DE) .................. 10 2011 005 774

(51) Int. Cl.
*G05D 13/64* (2006.01)
*H02P 21/00* (2016.01)

(52) U.S. Cl.
CPC ........... *H02P 21/0096* (2013.01); *H02P 21/50* (2016.02); *H02P 23/18* (2016.02)

(58) Field of Classification Search
USPC ......... 318/400.02, 807, 700, 400.01, 400.07, 318/721, 724, 560, 671, 632, 568.22
See application file for complete search history.

(56) References Cited

U.S. PATENT DOCUMENTS

| 4,578,763 A | * | 3/1986 | Jones | .................. | G05B 19/232 |
| | | | | | 318/571 |
| 4,925,312 A | * | 5/1990 | Onaga | .................. | B25J 9/1633 |
| | | | | | 318/568.22 |

(Continued)

FOREIGN PATENT DOCUMENTS

| CN | 1523465 A | 8/2004 |
| JP | 2000-102299 A | 4/2000 |

(Continued)

OTHER PUBLICATIONS

International Search Report corresponding to PCT Application No. PCT/EP2012/050549, mailed Apr. 8, 2013 (German and English language document) (5 pages).

*Primary Examiner* — Jorge L Carrasquillo
(74) *Attorney, Agent, or Firm* — Maginot, Moore & Beck LLP

(57) ABSTRACT

A method for controlling a position of an actuating element, to which a restoring force is applied, in an actuator system having an electronically commutated electrical machine, includes controlling the position of the actuating element as a function of a predefined setpoint position specification and an actual position specification. A position control unit provides an actuating variable which is associated with a space vector with which a stator arrangement of the electrical machine can be driven. The method further includes applying a correction variable to the space vector in order to correct a space vector angle of the space vector; providing an auxiliary signal; varying the space vector angle of the space vector, which is defined by the actuating variable, by the auxiliary signal; and integrating a variable to give an integration value.

9 Claims, 2 Drawing Sheets

(56) References Cited

U.S. PATENT DOCUMENTS

| | | | | |
|---|---|---|---|---|
| 5,406,474 A * | 4/1995 | Hansen | ................ | G05B 13/045 |
| | | | | 700/37 |
| 6,859,006 B2 * | 2/2005 | Hayashi | ................ | G03G 15/50 |
| | | | | 318/610 |
| 7,511,448 B2 * | 3/2009 | Terada | .................... | H02P 21/06 |
| | | | | 318/400.01 |
| 7,884,566 B2 * | 2/2011 | Abel | ...................... | G05B 11/36 |
| | | | | 318/560 |

FOREIGN PATENT DOCUMENTS

| | | |
|---|---|---|
| JP | 2000-209888 A | 7/2000 |
| JP | 2000-217385 A | 8/2000 |
| JP | 2003-348896 A | 12/2003 |
| JP | 2007-267576 A | 10/2007 |
| JP | 2008-87670 A | 4/2008 |
| JP | 2010-200432 A | 9/2010 |
| WO | 2005/067137 A1 | 7/2005 |

* cited by examiner

METHOD AND APPARATUS FOR ADAPTING COMMUTATION FOR AN ELECTRONICALLY COMMUTATED ELECTRICAL MACHINE

This application is a 35 U.S.C. §371 National Stage Application of PCT/EP2012/050549, filed on Jan. 16, 2012, which claims the benefit of priority to Serial No. DE 10 2011 005 774.9, filed on Mar. 18, 2011 in Germany, the disclosures of which are incorporated herein by reference in their entirety.

The disclosure relates generally to the control of electronically commutated electrical machines, in particular to features for adapting the angle of advance between an exciter field that is generated at a rotor of the electrical machine and a motor magnetic field that is generated by means of commutating the stator coils.

BACKGROUND

An electronically commutated electrical machine, for example a synchronous machine or an asynchronous machine, comprises a stator and a rotor. The stator is used to provide a motor magnetic field. The rotor comprises permanent magnets and/or linked rotor coils in order to provide an exciter magnetic field.

The stator comprises a plurality of stator coils that are allocated in each case to one or several phases of the electrical machine. In order to operate the electrical machine as a motor, the stator coils are energized in a suitable manner so that the motor magnetic field is generated. The interaction between the motor magnetic field and the exciter magnetic field produces a driving torque that acts on the rotor.

The individual stator coils are energized in accordance with a commutation method, wherein in order to generate a maximum driving torque it is necessary to advance the motor magnetic field in the direction of the exciter magnetic field, which motor magnetic field is generated by the stator coils. Since the rotor moves with respect to the stator coils, it is necessary, for the purpose of suitably energizing the stator coils, to know the position of the rotor (rotor position) and thus the direction of the exciter magnetic field in order to be able to generate the motor magnetic field with the corresponding angle of advance. A maximum driving torque can be achieved when advancing the motor magnetic field by 90° with respect to the exciter magnetic field (electrical rotor position; corresponds to the mechanical rotor position divided by the number of pole pairs of the rotor).

For this reason, an internal position sensor for detecting the rotor position is generally provided in electronically commutated electrical machines. The energizing patterns are then applied to the corresponding stator coils in dependence upon the rotor position that is detected by the position sensor. Generally, the internal position sensor is dimensioned such that it provides sufficient position resolution in order to perform the commutation.

When using an electronically commutated electrical machine for a positioner, it is possible in order to reduce the costs of detecting the rotor position to forego an internal position sensor and to detect only a position of the actuator that is operated by the electrical machine. When using a so-called external position sensor for the purpose of ascertaining the position of the actuator, both the cost for the electrical machine and also the cost for providing the cabling between the electrical machine and the control device are reduced and this constitutes an advantage. However, the actuator is frequently connected to the electrical machine by way of a reduction gear, so that it is not possible to obtain accurate information regarding the rotor position from the position of the actuator owing to the reduction ratio and owing to the unavoidable amount of play. It can be expedient for reasons of cost to limit the accuracy of the resolution of the position sensor even when using an internal position sensor.

The inaccuracies when ascertaining the rotor position from the position of the actuator result in it not being possible to adjust the angle of advance to the optimum angle of advance of 90°. Consequently, when using an external position sensor for the purpose of operating the electronically commutated electrical machine there is the disadvantage that it is not possible to operate the electrical machine at a maximum torque.

It is therefore the object of the present disclosure to provide an improved commutation of an electrically commutated electrical machine, where the information that is provided regarding a rotor position is less than accurate.

SUMMARY

This object is achieved by virtue of the method for adapting a commutation of an electronically commutated electrical machine in accordance with claim 1 and also by virtue of the apparatus and the motor system in accordance with the subordinate claims.

Further advantageous embodiments are disclosed in the dependent claims.

In accordance with a first aspect, a method is provided for controlling the position of an actuator that is influenced by a restoring force in a positioner system having an electronically commutated electrical machine. The method comprises the following steps:

controlling the position of the actuator in dependence upon a predefined set position value and an actual position value, wherein the position control provides a position variable that is allocated to a space vector with which it is possible to control a stator arrangement of the electrical machine;

influencing the space vector by a correction variable in order to correct a space phasor angle of the space vector;

providing an auxiliary signal;

varying the space phasor angle of the space vector that is defined by the position variable, by means of the auxiliary signal;

integrating a variable to form an integration value, wherein the variable to be integrated depends upon the auxiliary signal and the position variable of the position control that was obtained in response to varying the space phasor angle of the space vector, wherein the correction variable (PO) is derived from the integration value.

An idea of the above-mentioned method resides in that in a positioner system whose actuator is to be set to a position, even when using a position sensor whose position resolution is insufficient for the purpose of ascertaining a proper commutation pattern for controlling the stator coils, it is possible to control the electrical machine of the positioner system in such a manner that an angle of advance of the motor magnetic field with respect to the exciter magnetic field is adapted preferably to 90°. This is achieved by virtue of the fact that a position variable from a position control for the purpose of adjusting the position of the actuator is corrected with the aid of a correction variable to a set position. The correction is performed in that the position variable of a position control circuit is corrected using phase offset that according to a periodic auxiliary signal causes a variation of the space phasor angle of the space vector that corresponds to the position variable. The corresponding reaction of the position control is analyzed.

If the motor magnetic field is advanced by precisely 90° with respect to the exciter magnetic field, this produces a variation in the space phasor angle in the two half-waves of the auxiliary signal in the middle to a constant weakening of the positioning torque, so that a variation in the position variable is not produced. In the case of a deviation of the angle of advance between the motor magnetic field and the exciter magnetic field from the ideal angle of advance of 90°, the variation of the space phasor angle causes a differing increase and/or reduction in the positioning torque and as a consequence causes a reaction of the position control in the form of a fluctuation of the position variable, the frequency of which corresponds to the frequency of the auxiliary signal. This fluctuation of the position variable can be evaluated accordingly in order to adapt the correction variable. Even position sensor signals that are encumbered with tolerances can be used in this manner for the commutation process, since by means of the above method the correction variable compensates for any inaccuracy of the position sensor. It is also possible to compensate for any sensor errors, such as thermal drifting, effects of manufacturing tolerances or aging effects, which occur during the course of the operation in the position sensor and change the optimum angle of advance from the motor magnetic field with respect to the exciter magnetic field.

It is possible to provide that the auxiliary signal and the position variable that is obtained by varying the space phasor angle of the space vector are band-pass filtered, wherein the variable that is to be integrated corresponds to a product of the band-pass filtered auxiliary signal and the band-pass filtered position variable that is obtained by varying the space phasor angle of the space vector.

Furthermore, the variable that is to be integrated can be low-pass filtered prior to being integrated.

In accordance with one embodiment, a preliminary control can be provided in order to allocate the set position value to a pre-control variable with which the position variable that is provided by the position control is influenced, in particular by means of addition.

Furthermore, the auxiliary signal can be periodic and a main frequency of the periodic auxiliary signal can be less than the limit frequency of the position control.

In particular, the auxiliary signal can be periodic and can be provided as a square wave signal, a trapezoid signal or a sinusoid signal or as a combination thereof.

Furthermore, it can be provided that the space phasor angle is varied in a range of up to +/−20°, in particular in a range of up to +/−10° of the space phasor angle.

In accordance with a further aspect, apparatus is provided for controlling the position of an actuator in a positioner system having an electronically commutated electrical machine. The apparatus comprises:
  a position control unit for performing a position control in dependence upon a predefined set position value and an actual position value, wherein the position control provides a position variable that is allocated to a space vector with which it is possible to control a stator arrangement of the electrical machine;
  a device for influencing the space vector by a correction variable in order to correct a space phasor angle of the space vector;
  a signal generator for providing an auxiliary signal;
  a device for varying the space phasor angle of the space vector that is defined by the position variable, by means of the auxiliary signal;
  an integrator for integrating a variable to form an integration value, wherein the variable to be integrated depends upon the auxiliary signal and the position variable of the position control that was obtained in response to varying the space phasor angle of the space vector, wherein the correction variable (PO) is derived from the integration value.

In accordance with a further aspect, a positioner system is provided. The positioner system comprises:
  an actuator that is influenced by a restoring force;
  a position sensor for providing an actual position value;
  an electrical machine that is coupled to the actuator;
  the above-mentioned apparatus.

In accordance with a further aspect, a computer program product is provided that comprises a program code that performs the above-mentioned method when said program code is implemented on a data processing unit.

BRIEF DESCRIPTION OF THE DRAWINGS

Preferred embodiments of the present disclosure are explained in detail hereinunder with reference to the attached drawings in which.

DETAILED DESCRIPTION

Figure 1:
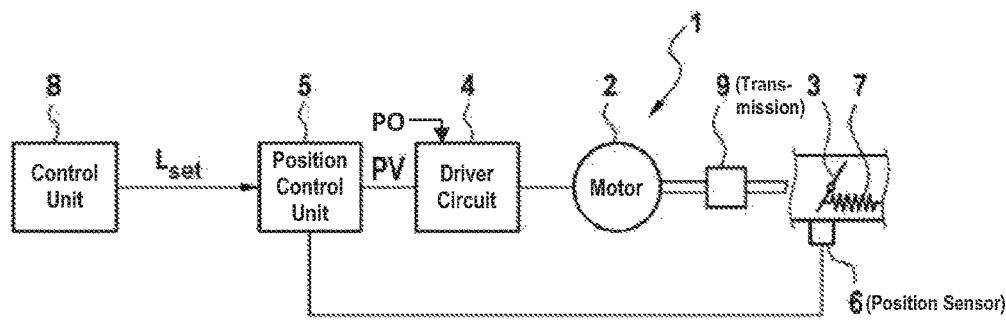
FIG. 1 illustrates a schematic representation of a positioner system for positioning an actuator.

FIG. 1 illustrates a schematic representation of a positioner system 1 having a synchronous motor 2 as an electronically commutated electrical machine, wherein a rotor (not illustrated) of the synchronous motor 2 is coupled to an actuator 3, for example by way of a transmission 9 or the like. The positioner system can for example correspond to a throttle valve actuator in a combustion engine, wherein the actuator 3 corresponds to the throttle valve. The actuator 3 can be influenced by a restoring spring 7, so that a predefined torque must be exerted by the synchronous motor 2 in order to adjust the actuator 3 to a specific position.

The synchronous motor 2 requires information regarding the rotor position of the rotor in order to operate correctly. As illustrated in FIG. 1, an external position sensor 6 is provided on the actuator 3. The information regarding the rotor position is obtained in this exemplary embodiment from the position variable for the purpose of adjusting the actuator 3, so that position information regarding a rotor position of the synchronous motor 2 is only indirectly available.

In alternative embodiments, although the synchronous motor 2 can be provided with an internal position sensor, it is possible—depending upon the embodiment—that said position sensor does not have sufficient position resolution for the required commutation process, so that it is not possible to perform the commutation process correctly.

The synchronous motor 2 is controlled by a driver circuit 4 that in dependence upon a position variable PV generates phase voltages and/or phase currents for supplying to the synchronous motor 2. The driver circuit 4 comprises a final stage (not illustrated) that is generally embodied with so-called inverter circuits and can, depending upon the number of phases, comprise a 2H bridge circuit, a B6 circuit or the like. The driver circuit 4 comprises furthermore an allocation function in order to convert the position variable PV into a corresponding energizing pattern for the synchronous motor 2.

The position variable PV is provided in a suitable manner by a position control unit 5, for example in the form of control signals that are generated by said control unit in dependence upon a set position $L_{set}$. The set position $L_{set}$ is provided by a control unit 8 and can depend upon externally predefined variables. The position variable PV is converted with the aid of the power end stage 4 into voltage or current progressions for the stator windings of the synchronous motor 2, so that on the one hand the position variable indicates a magnitude of the phase voltages that indicate an amplitude of a space vector that defines the motor magnetic field. Furthermore, the position variable PV can indicate the space phasor angle of the space vector, so that in order to provide a largest possible driving torque of the synchronous motor 2 and/or a largest possible level of efficiency, an angle of advance of 90° of the electrical rotor position is achieved between a motor magnetic field that is generated by stator coils of the synchronous motor 2 and an exciter magnetic field that is generated for example by permanent magnets in the rotor of the synchronous motor 2.

In general, the position of the rotor is obtained by means of a position sensor 6. In the present case, the position sensor 6 is embodied on the actuator 3 in order to ascertain the position variable. Depending upon the reduction ratio of a movement of the rotor of the synchronous motor 2 with respect to the actuator 3, which reduction ratio is provided by the transmission 9, the resolution of the rotor position, which is ascertained from the position variable of the actuator 3, can never be accurate because in particular it is not possible to ensure that the commutation process is performed correctly with an as accurate as possible angle of advance of 90° between the motor magnetic field and the exciter magnetic field.

Figure 2:
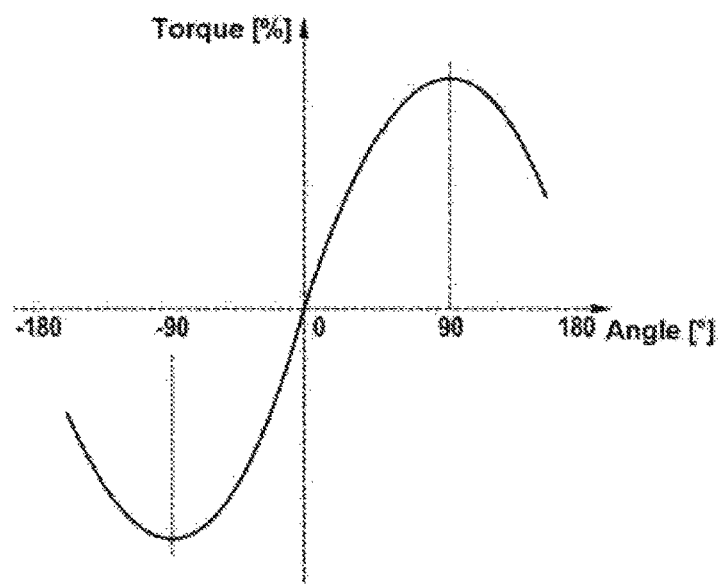
FIG. 2 illustrates a representation of the progression of the torque with respect to an angle of advance between the motor magnetic field and an exciter magnetic field that is generated by the rotor.

In order for the synchronous motor 2 to provide the greatest possible positioning torque in the case of the predefined amplitude of the space vector for adjusting the actuator 3, an angle of advance is necessary between the motor magnetic field that is generated by the stator coils of the synchronous motor 2 and the exciter magnetic field that is generated by the rotor. The progression of the positioning torque is represented by way of example in FIG. 2, which progression is dependent upon the angle of advance of the positioning torque. It is evident that the maximum positioning torque is available in the case of an angle of advance of 90° of the electric rotor position.

Figure 3:
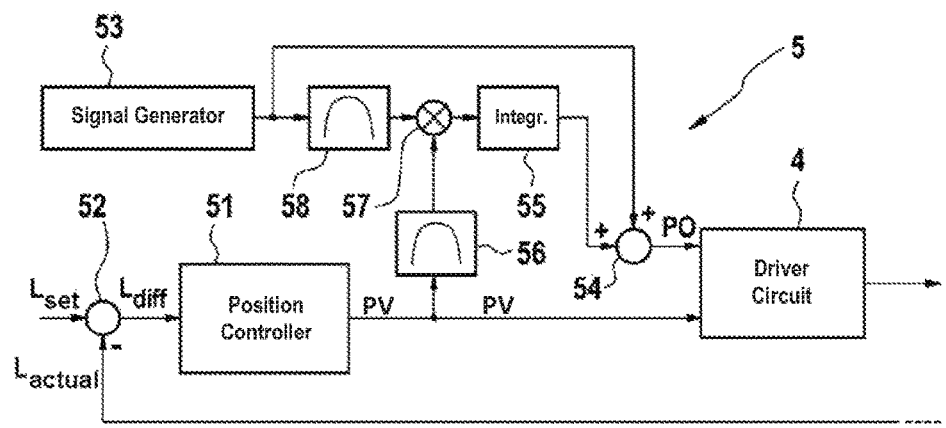
FIG. 3 illustrates a schematic representation of the position control showing an adaptation to an angle of advance of 90°.

FIG. 3 illustrates in detail the rotor control that is implemented by means of the position control unit 5. The position control unit 5 comprises a position controller 51 which receives a position difference from a difference element 52. The difference element 52 receives a set position $L_{set}$ and the actual position $L_{actual}$ that is provided by the position sensor 6 and ascertains a difference signal $L_{diff}$ that is provided to the position controller 51. The position controller 51 generates a position variable PV, which is supplied to the driver circuit 4 that applies a commutation pattern to the synchronous motor 2, which commutation pattern corresponds to the position variable PV.

The position variable PV fundamentally represents a value for a positioning torque. The magnitude of the positioning torque corresponds to a position of the actuator 3, wherein the resilient force of the restoring spring 7 and the positioning force provided by the positioning torque are balanced at the restoring spring 7.

The required phase position of the voltage and current progressions can always be generated from the position sensor signal by means of an initial adjustment of the position sensor 6 with respect to the rotor position. The adjustment can be performed using a correction variable that can be provided for example as a phase offset PO and that provides for example a correction angle that is added to the space phasor angle of the space phasor angle that is provided by the position variable PV. The sensor errors of the position sensor 6 that occur during the course of the operation, for example as a result of thermal drifting, cause the rotor position of the rotor of the synchronous motor 2, which rotor position is ascertained from the position variable, to deviate from the actual rotor position. Furthermore, deviations can also occur as a result of play in the transmission 9 and inaccuracies as a result of the reduction ratio of the transmission 9. As a consequence, the optimum advance of the motor magnetic field with respect to the exciter magnet field changes which causes a reduction in the level of efficiency in the magnitude illustrated in FIG. 2. An adaptation method can be provided in order to compensate for these deviations.

In the position control circuit shown in FIG. 3, the phase offset PO is embodied from two parts. This renders it possible to permanently adapt the phase offset PO in dependence upon a deviation of the measured actual position $L_{actual}$ from the actual position. A signal generator 53 is provided for this purpose, which signal generator generates a periodic signal in essentially constant cycle times, in particular in the form of a square wave. The frequency of the periodically alternating signal is selected such that said frequency is below the operating frequency of the positioner system 1. The periodic signal is supplied to a summation element 54, the output of which provides the phase offset PO. The periodically alternating signal represents a part of the phase offset PO. It is also possible to use another non-periodic signal in place of a periodic signal for variation purposes in order to obtain the phase offset PO.

A further input of the summation element 54 is provided by an integrator 55. Therefore, in the case of an initial integrator value of zero only the periodically alternating signal of the signal generator 53 corresponds to the phase offset PO that corresponds to an offset angle that is added to the space phasor angle.

If the actual position $L_{actual}$ that is provided (measured) by the position sensor 6 corresponds to the actual position of the actuator 3, then it is not possible to observe the variation of the phase offset PO at the position sensor 6. The reason for this is that the torque fluctuations generally balance out since the positioning torques when applying the positive and negative half-wave of the periodically alternating signal of the signal generator 53 weaken the positioning torque in the same manner, so that the position controller 51 does not balance out a variation of this type and there is no corresponding periodicity of the position variable PV. By virtue of suitably selecting and/or limiting the amplitude of the periodically alternating signal that is provided by the signal generator 53, it is possible to weaken the positioning torque by means of the periodically alternating signal.

If the phase offset PO apart from the periodically alternating signal from the signal generator 53 does not correspond with the phase offset PO that is required for a maximum positioning torque, then there is a deviation from an angle of advance of 90° between the motor magnetic field and the exciter magnetic field. In this case, the positive and the negative half-wave of the periodically alternating signals cause different positioning torques. Said different positioning torques are converted in the case of correspondingly low-frequency periodicity into detectable periodic position changes of the difference signal $L_{diff}$.

The position controller 51 attempts to balance out these position changes, so that the corresponding periodicity occurs on the position variable PV. In order to adapt the position variable PV to the phase offset PO, the position variable PV is supplied to a multiplying element 57 by way of a band-pass filter 56. The band-pass filter 56 comprises a band-pass frequency range that ensures that only that part of the position variable PV that corresponds to the frequency range of the periodically alternating signal of the signal generator 53 is further transmitted to the multiplying element 57. The periodically alternating signal of the signal generator 53 is likewise supplied to the multiplying element 57 by way of a second band-pass filter 58, in particular a second band-pass filter 58 that corresponds to the first band-pass filter 56.

An output of the multiplying element 57 that multiplies both the filtered position variable PV and also the filtered periodically alternating signal together is connected to the integrator 55. The integrator 55 can be provided for example as a smoothing low-pass filter having an integrator part, so that the filter output signal establishes a part of the required phase offset PO. The output signal of the integrator 55 is adjusted by means of the algebraic sign of the deviation of the phase offset PO from the ideal phase offset PO. The algebraic sign of the deviation of the phase offset PO indicates whether the position variable PV is predominantly equal to or in phase opposition to the periodically alternating signal of the signal generator 53. In the first case, the smoothed result of the multiplication is positive, otherwise it is negative. As a consequence, the integrator part is correspondingly increased or reduced, so that the integrator part can be adjusted in both directions.

Furthermore, as the magnitude of the deviation between the phase offset PO and the ideal phase offset increases, the amplitude of the fluctuations of the position variable PV increases and consequently also the signal strength after multiplication in the multiplication element 57. As a consequence, the greater the magnitude of deviation between the phase offset PO and the ideal phase offset, the greater the rate at which the integrator value is supplied to the ideal phase offset.

The efficacy of the described method is further increased if the position controller 51 is augmented by a special transmission path having imaginary pole pairs, wherein the pole positions are selected such that they match the main frequency parts of the signal generator signal.

Furthermore, in order to avoid abrupt torque surges, it is possible to provide that the edge steepness of the periodically alternating signal of the signal generator 53 is limited and to provide in its place a trapezoid signal or the like. It is essential that the periodically alternating signal is zero-point symmetric, in other words that the negative and positive half-waves in each case overlap the same areas. The smoothing low-pass filter of the integrator 55 can be embodied with an FIR or IIR structure and/or a suitable combination of these structures.

Figure 4:
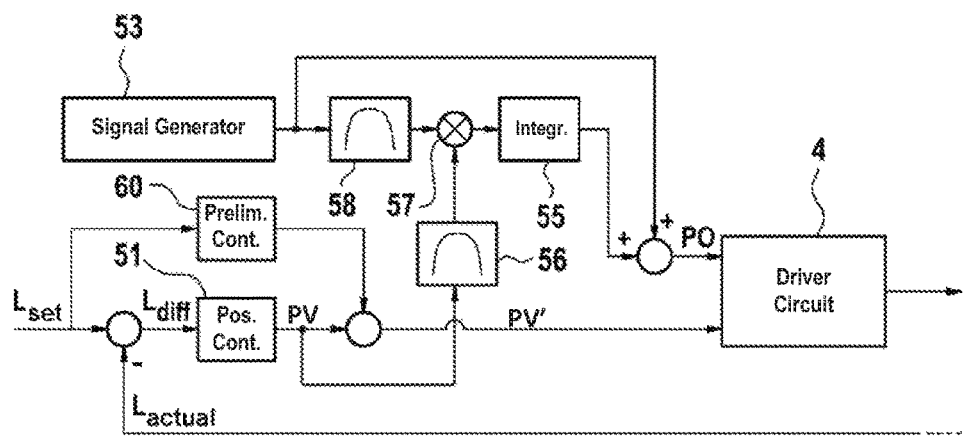
FIG. 4 illustrates a further embodiment of the position control of FIG. 3.

FIG. 4 illustrates a further embodiment, wherein the position controller 51 is provided with a preliminary control unit 60. The preliminary control unit receives the set position $L_{set}$ and allocates this to a preliminary control value that is added to the position variable PV with the aid of a further summation element 61. The allocation of the preliminary control value to the set position $L_{set}$ can be applied prior to commissioning the positioner system. Consequently, the position controller 51 can be optimized to suit the interference behavior and the phase offset PO can be adjusted in a reliable manner even during the desired position changes.

The invention claimed is:

1. A method for controlling a position of an actuator of a positioner system, the actuator being influenced by a restoring force and being driven by an electronically commutated electrical machine comprising:
    measuring an actual position value of the actuator using a position sensor;
    generating a position variable based on a predefined set position value and the actual position value using a position controller;
    generating a phase offset based on an auxiliary signal and the position variable, the generating of the phase offset comprising:
        providing the auxiliary signal using a signal generator;
        generating an intermediate variable by forming a product of the auxiliary signal and the position variable using a multiplying element; and
        generating the phase offset by integrating the intermediate variable using an integrator; and
    controlling a stator arrangement of the electrical machine based on the position variable and the phase offset using a driver circuit, the driver circuit being operably connected to receive the position variable and the phase offset, the driver circuit being configured to (i) allocate the position variable to a space vector, (ii) correct a space phasor angle of the space vector based on the phase offset and (iii) apply a commutation pattern to the electrical machine based on the space vector.

2. The method as claimed in claim 1, the generating of the phase offset further comprising:
    before forming the product of the auxiliary signal and the position variable, filtering the auxiliary signal using a band-pass filter; and
    before forming the product of the auxiliary signal and the position variable, filtering the position variable using a band-pass filter.

3. The method as claimed in claim 1, the generating of the phase offset further comprising:
    before integrating the intermediate variable, filtering the intermediate variable using a low-pass filter.

4. The method as claimed in claim 1, further comprising:
    generating the predefined set position value using a preliminary control.

5. The method as claimed in claim 1, wherein:
    the auxiliary signal is periodic; and
    a main frequency of the periodic auxiliary signal is less than an operating frequency of the position controller.

6. The method as claimed in claim 1, wherein:
    the auxiliary signal is periodic; and
    the periodic auxiliary signal is provided as at least one of a square wave signal, trapezoid signal, a sinusoid signal, and as a combination thereof.

7. The method as claimed in claim 1, wherein the phase offset is in a range of up to +/−10° of the space phasor angle.

8. An apparatus for controlling a position of an actuator in a positioner system, the actuator being influenced by a restoring force and being driven by an electronically commutated electrical machine, the apparatus comprising:
- a position control unit operable connected to the position sensor, the position control unit being configured to generate a position variable based on a predefined set position value and an actual position value of the actuator, the actual position value being measured by a position sensor;
- a signal generator configured to provide an auxiliary signal;
- a multiplying element operably connected to the position control unit and the signal generator, the multiplying element being configured to generate an intermediate variable by forming a product of the auxiliary signal and the position variable;
- an integrator operably connected to the multiplying element, the integrator being configured to generate a phase offset by integrating the intermediate variable; and
- a driver circuit operably connected to receive the position variable and the phase offset, the driver circuit being configured to (i) allocate the position variable to a space vector, (ii) correct a space phasor angle of the space vector based on the phase offset and (iii) apply a commutation pattern to the electrical machine based on the space vector.

9. A positioner system comprising:
an actuator that is influenced by a restoring force;
a position sensor configured to measure an actual position value of the actuator;
an electrical machine that is coupled to the actuator and configured to drive the actuator;
an apparatus configured to control a position of the actuator including:
- a position control unit operable connected to the position sensor, the position control unit being configured to generate a position variable based on a predefined set position value and the actual position value;
- a signal generator configured to provide an auxiliary signal;
- a multiplying element operably connected to the position control unit and the signal generator, the multiplying element being configured to generate an intermediate variable by forming a product of the auxiliary signal and the position variable;
- an integrator operably connected to the multiplying element, the integrator being configured to generate a phase offset by integrating the intermediate variable; and
- a driver circuit operably connected to receive the position variable and the phase offset, the driver circuit being configured to (i) allocate the position variable to a space vector, (ii) correct a space phasor angle of the space vector based on the phase offset and (iii) apply a commutation pattern to the electrical machine based on the space vector.

\* \* \* \* \*